Dec. 11, 1956    H. C. FARMER ET AL    2,773,830
SUBSURFACE WASHING OF BED
Filed Jan. 11, 1954
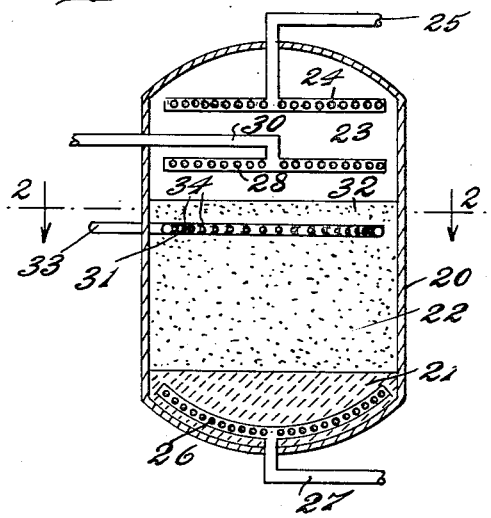
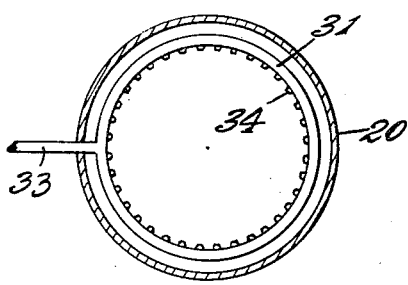
INVENTOR
Harold C. Farmer
Vincent B. Burgess
BY
ATTORNEYS.

United States Patent Office 2,773,830
Patented Dec. 11, 1956

2,773,830
SUBSURFACE WASHING OF BED

Harold Charlton Farmer, Wynnewood, and Vincent B. Burgess, Morton, Pa.

Application January 11, 1954, Serial No. 403,414

1 Claim. (Cl. 210—24)

The present invention relates to processes of filtration and particularly ion exchange and to ion exchangers in which provision is made for lengthening of the operative cycle by back washing locally below the top of the bed and desirably at an interval between the beginning and then end of the service phase or preferably at a plurality of intervals at the service phase.

A purpose of the invention is to prevent the loss of efficiency in filters and particularly in ion exchange beds, due to the accumulation of a gelatinous deposit adjacent to the top of such beds.

A further purpose is to prevent ions intended to be absorbed from passing through an ion exchange bed in excessive quantities before the time when the service phase of the cycle would normally end.

A further purpose is to reduce channeling in filters and particularly ion exchange beds.

A further purpose is to avoid the formation of agglomerates of ion exchange material in an ion exchange bed which tend to accumulate at the bottom and to resist regeneration and become a source of contamination of the service water.

A further purpose is to maintain filters and especially ion exchange beds at high levels of efficiency during periods when algae are deposited by water passing through such beds.

A further purpose is to locally backwash the bed during the filtration or service phase of the cycle from a position above the bottom of the bed and preferably immediately below the top thereof, by introducing water horizontally, and desirably to repeat the local backwashing a plurality of times during the service phase and before the backwash phase in which the entire body of the bed is backwashed.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

Figure 1 is a diagrammatic central vertical section of a filter, particularly a cation exchanger, embodying the principles of the invention.

Figure 2 is a diagrammatic section of Figure 1 on the line 2—2.

Difficulty has been encountered in the operation of filters, particularly in the filtration of water, but also in the case of other liquids, due to clogging of the filter medium by material carried in the liquid to be filtered. This has been overcome in many cases by backwashing through the entire filter bed at the end of the filtration or service phase of the cycle. In some cases, however, it has been found that this only partially solves the problem, and the filter medium becomes progressively impaired and the efficiency of the filter progressively reduces.

This difficulty has been particularly serious in the case of ion exchangers, especially cation exchangers, where the bed is composed of a relatively expensive material, and replacement would therefore be costly. In the operation of cation exchange beds at Schuylkill Station of the Philadelphia Electric Company, Philadelphia, Pennsylvania, it has been observed over a period of time that the capacity of the units gradually reduces, until after a few months' operation it has decreased to about 60 percent of the initial capacity. This loss of capacity has been accompanied by a tendency to pass cations such as calcium and magnesium into the service water long before the service phase of the cycle should normally be complete making it necessary to regenerate more frequently. This mysterious tendency to allow cations to pass through notwithstanding proper regeneration technique, has been investigated by us in an effort to correct this difficulty.

We have observed that the tendency for impairment of the beds is greater in midwinter and the latter part of the summer. Our investigation indicates that the difficulty is associated in part with the tendency of the water to deposit gelatinous material associated with algae, although it also appears that minerals are deposited such as silica, alumina and iron, possibly as ferric hydroxide. It appears evident from our studies that a deposit forms in about the upper six inches of the bed (beds actually used were approximately six feet thick) and that this deposit tends to cement or agglomerate particles of filter or ion exchange medium, and form a crust at the top of the bed.

These agglomerates, if allowed to accumulate, appear to contribute to the impairment of the functioning of the bed in several ways. As the bed continues to operate the agglomerates grow larger and work their way down, and as they grow larger they are relatively heavier and tend to stay down near the bottom. During the backwashing therefore the heavier agglomerates are not forced up to the top as readily as other particles. They therefore less readily come in contact with strong regenerating solution, and, being massive, tend to resist regeneration. Insofar as the agglomerates travel vertically either during the service phase or the backwash phase, they tend to clear other particles from their path, and thus create channelling so that water can pass through the bed without normal exposure to ion exchanger material and so that regenerating solution does not come in contact with all particles. In ion exchangers particularly, the crust which forms at the top tends to be broken up during backwashing to create channels for passage of the water without coming in contact with the full bed. On the next service cycle agglomerates near the bottom of the bed tend to discharge calcium and magnesium ions to the service water, since they have retained such ions due to incomplete regeneration.

The agglomerates and the crust which tends to form at the top of the bed cannot be broken up by ordinary backwashing, and in fact they are resistant to air lancing.

Efforts made to increase the velocity of the normal backwashing water, even to the extent that the top strata of the rinse bed was carried out with the backwash, failed to solve the problem.

We have discovered that this difficulty can be overcome and we have successfully brought ion exchange beds back to 100 percent capacity after they had reduced to 60 percent capacity, by applying localized backwashing, before the end of the backwash and preferably during the service phase of the cycle. The localized backwashing is preferably accomplished before the general backwashing used in the backwash phase of the cycle, and is preferably employed at one or preferably several times during the service phase of the cycle, by temporarily interrupting the service phase. The localized backwashing to be most effective, should be applied immediately below the top of the bed, preferably about a foot below the top, although it is advantageous if it is administered at any position above the bottom. The water should be introduced horizontally. Thus the force of the water is not utilized in undesirably churning up the entire bed, but is applied directly to the layer at the top.

Backwashing in this way is believed to be helpful in restoring the bed to its normal capacity in a number of ways. In the first place, the localized backwash stream mechanically breaks up agglomerated particles and thus prevents such agglomerates from becoming large. Secondly, since the localized backwash applies an upwardly flowing stream, there is a tendency to counteract the disposition of agglomerates to move downwardly, so that the agglomerates remain in a position where they will come in contact with strong regenerating solution. Furthermore, the tendency to channel is overcome and service water and regeneration solution both proceed normally through the bed. There is also a tendency to remove foreign matter present in the zone at the top of the bed by entrainment during the localized backwash.

Since the localized backwash can be applied at two or more times during the service cycle, it is possible to obtain its favorable influence before agglomerates grow to a size at which they are particularly harmful. Furthermore, since the localized backwash tends to prevent agglomerates from moving down, and since agglomerates appear to get progressively larger as they do move down, the effect is to oppose formation of large agglomerates. If the localized backwashing near the top is applied during general backwashing, it serves to concentrate the effect right near the top of the bed.

In some cases the localized backwash has been applied at the end of the service phase of the cycle before the general backwash through the entire height of the bed, but for better results it has been employed at the end of one-third and two-thirds of the service phase of the cycle. Good results have also been obtained with several localized backwashes at equal intervals throughout the length of the cycle and one at the end before the general backwash.

Considering now the drawings more in detail, Figures 1 and 2 show an ion exchanger 20, suitably a metallic tank, containing a supporting base of porous material such as coal at the bottom at 21, supporting thereon a bed of ion exchange material 22, suitably a cation exchange material, which may be a zeolite water softener, but will preferably be a cation exchange synthetic resin of the character of any of the resins described in Kunin and Myers, Ion Exchange Resins (1950).

The bed 22 will preferably be of the order of approximately six feet thick when using a resin of the character of phenolic or styrene base resins.

Above the bed 22 is a space 23 which normally contains inlet water. Water is introduced into the ion exchanger at the top through a water distributing lateral 24 connected to a pipe 25 coming in from the outside. During the service phase of the cycle, water is withdrawn from an outlet lateral 26 placed in the supporting base 21 and connecting through a discharge pipe 27. A regenerating solution distributing lateral 28 is provided above the ion exchange bed 22 and preferably beneath the water inlet lateral, and this connects to a regenerating solution pipe 30.

In accordance with the invention a localized backwash lateral 31 is placed in the bed of ion exchange resin, and suitably just below the top crust 32, which normally extends down about six inches in a commercial ion exchange bed. It has been found desirable to position the lateral 31 about a foot below the top of the ion exchange bed. The lateral 31 connects to an inlet pipe 33.

In accordance with one form of the invention, the localized backwash lateral 31 has horizontally directed jet openings 34 at a position immediately below the top of the bed at intervals throughout the arms of the lateral, which will discharge water horizontally in localized backwash.

During the normal service phase of the cycle, the cation exchange bed 22 collects cations such as calcium, magnesium and sodium from the water flowing downwardly from the inlet lateral 24 through the ion exchange bed and out the discharge lateral 26. As the ion exchange capacity of the resin bed is reached, cations will begin to pass into the service water, and as this condition is encountered the end of the service phase of the cycle is reached in normal operation.

According to normal prior art practice, which is also followed in the present invention, at the end of the service phase of the cycle, the resin bed 22 is backwashed by passing the raw water upwardly from the lateral 26 through the full height of the resin bed and out the lateral 24. Suspended solid material which may have accumulated is thus washed out of the resin bed and the resin bed is redistributed and fluffed up.

In the next stage of the cycle, according to the prior art and also according to the present invention, regeneration solution, usually dilute sulfuric acid, is passed in through the lateral 28, down through the resin bed and out through the lateral 26. Finally the resin bed is washed by raw water passed in through the lateral 24 at the top and out through the lateral 26 at the bottom.

Under normal prior art practice, the service phase of the cycle is uninterrupted, continuing from the end of the rinse to the beginning of the next backwashing. In accordance with the present invention, however, the service phase of the cycle includes one or more localized backwashings applied by introducing water through the localized backwash lateral 31 to flow horizontally and then upwardly through the crust 32 and out the top lateral 24.

This localized backwashing is preferably applied at the end of the service cycle immediately before the backwash phase of the cycle, and it is preferably also applied at one or more intervals between the beginning and the end of the service phase of the cycle, suitably at the half-way point, or at the one-third and two-thirds point. The localized backwash may however, be applied during general backwashing. The localized backwash water is preferably introduced with sufficient force and volume to break up the agglomerates, but not sufficient to wash them out the top of the ion exchanger.

While the invention is believed to have its widest application to ion exchangers, it is also considered to be applicable to other filter beds, including filters of the type in which spent ion exchange material is used as a filter medium, and also to filters using other media such as slow sand water filters, coal filters, and also filters for oil, and other liquids.

In view of our invention and disclosure variations and modifications to meet individual whim or particular need will doubtless become evident to others skilled in the art, to obtain all or part of the benefits of our invention without copying the process shown, and we, therefore, claim all such insofar as they fall within the reasonable spirit and scope of our claim.

Having thus described our invention what we claim as new and desire to secure by Letters Patent is:

The process of ion exchange in water containing finely divided material in suspension, using a bed of particles of ion exchange medium, which comprises passing downwardly, through the ion exchange bed during a service phase of the cycle, said water having constituents characterized by a tendency to agglomerate said particles, and subsequently introducing wash water forcefully in streams from a plurality of jets at a level beneath and adjacent the surface of the bed entirely horizontally and thereby causing agglomerates to settle into the path of the jets and by the impact of the streams breaking up the agglomerates, and simultaneously carrying off the wash water and fine suspended material upwardly through the top of the bed.

References Cited in the file of this patent

UNITED STATES PATENTS

| | | |
|---|---|---|
| 654,479 | McNalley | July 24, 1900 |
| 678,532 | Bachman | July 16, 1901 |
| 1,794,841 | Elfreth | Mar. 3, 1931 |
| 1,926,681 | Lauterbur et al. | Sept. 12, 1933 |
| 1,942,807 | Dotterweich | Jan. 9, 1934 |
| 2,351,835 | Pick | June 20, 1944 |
| 2,461,619 | Wolcott | Feb. 15, 1949 |
| 2,472,976 | Hoover | June 14, 1949 |